United States Patent [19]

Saito et al.

[11] Patent Number: 4,747,576
[45] Date of Patent: May 31, 1988

[54] FLOW CONTROL VALVE

[75] Inventors: Hiroji Saito; Mamoru Ozeki, both of Zama, Japan

[73] Assignee: Toshiba Kikai Kabushiki Kaisha, Tokyo, Japan

[21] Appl. No.: 840,548

[22] Filed: Mar. 17, 1986

Related U.S. Application Data

[63] Continuation of Ser. No. 548,408, Nov. 3, 1983, abandoned.

[30] Foreign Application Priority Data

Nov. 4, 1982 [JP] Japan .................................. 57-192385

[51] Int. Cl.4 ......................................... F16K 31/122
[52] U.S. Cl. ........................................ 251/60; 251/25; 251/285
[58] Field of Search ....................... 137/625.63, 625.64; 92/13.8; 251/60, 63, 63.5, 25, 285

[56] References Cited

U.S. PATENT DOCUMENTS

| 417,112 | 12/1889 | Steininger | 251/60 X |
|---|---|---|---|
| 2,194,681 | 3/1940 | Wheler et al. | 251/63 X |
| 2,716,965 | 9/1955 | Klamp | 92/13.8 X |
| 2,783,591 | 3/1957 | Johnson | 92/13.8 X |
| 3,213,886 | 10/1965 | Pearne | 251/285 X |
| 3,324,887 | 6/1967 | Mueller | 137/625.63 |
| 3,502,109 | 3/1970 | Straight | 137/625.64 |
| 3,513,877 | 5/1970 | Tennis | 251/285 X |
| 3,771,565 | 11/1973 | Padula | 137/625.64 |
| 4,023,466 | 5/1977 | Strassheimer | 251/60 X |
| 4,041,983 | 8/1977 | Bianchetta | 137/625.63 |
| 4,076,210 | 2/1978 | Spieluogel | 251/60 X |
| 4,114,650 | 9/1978 | Gordon | 137/625.63 |
| 4,287,812 | 9/1981 | Iizumi | 251/60 X |
| 4,319,609 | 3/1982 | Debrus | 137/625.63 |
| 4,378,335 | 3/1983 | Bodene et al. | 251/63 X |

Primary Examiner—Samuel Scott
Assistant Examiner—Allen J. Flanigan
Attorney, Agent, or Firm—Birch, Stewart, Kolasch & Birch

[57] ABSTRACT

A flow control valve in which the main body of the valve and the first and the second cylinder is disposed coaxially with each other. The valve body disposed in the main body forms a first and a second separate chamber in the main body. A first and a second valve rod projecting from the valve body opposes the first and the second cylinder, respectively. The displacements of the pistons in the first and the second cylinder due to a fluid limits the displacement of the valve rods and the valve body. The opening and the closing of the passageway between the first and the second separate chamber is adjusted by the movement of the valve body, thereby flow of fluid being controlled.

3 Claims, 5 Drawing Sheets

FLOW CONTROL VALVE

BACKGROUND OF THE INVENTION

This application is a continuation of application Ser. No. 548,408 filed on Nov. 3, 1983 now abandoned.

The present invention relates to flow control valves for controlling the operating speed of cylinders, and more particularly to such valves which can regulate flow of a fluid circuit to change operating speed of a cylinder at several levels.

It may become necessary in die casting process, for example, to change the injection speed at three levels in one and the same step. That is, when the molten metal is filled into the metallic mold, too high a gate speed may result in insufficient exhaustion of the air from the cavity, whereas low gate speed equal to that at which the molten metal is filled into the sleeve may result in solidification of the molten metal, both of which may eventually lead to defective products. Thus, a speed which is intermediate between the conventionally used high and low speed is necessary when the molten metal is filled into the metallic mold.

Conventional flow control valves for controlling the injection speed at three levels, however, have been constructed in parallel with respect to the hydraulic circuit so that the rate of flow at each level could not be controlled independently from each other. Further, although such valves connected in series have also been proposed which are capable of controlling the flow at each level independently from each other, they are capable of controlling the rate of flow only stepwise. Thus, there have at least been no conventional valves which are capable of controlling the rate of flow at three arbitrary levels which are independent from each other.

SUMMARY OF THE INVENTION

Thus, the principal object of the present invention is to overcome the disadvantages of the conventional devices mentioned above and to provide a flow control valve which is capable of changing the operating speed of a cylinder at several different levels.

Thus, a flow control valve according to the present invention comprises a main body, a first and a second cylinder, and first, second and third on-off valves.

The main body of the valve opens and closes a fluid passageway which may, for example, be the main fluid circuit for a molding machine. The main body regulates the degree of opening of the fluid passageway to control the amount of flow of the fluid therethrough. The main body includes a first valve rod projecting from one side thereof, and a second valve rod projecting from the other side thereof.

The first cylinder is disposed in the exterior of the main body to one side thereof, and accommodates a piston which limits the displacement of the position of the first valve rod. The second cylinder is disposed in the exterior of the main body to the other side thereof, and accommodates a piston which limits the displacement of the position of the second valve rod.

The first on-off valve supplies a predetermined fluid to the main body and controls the flow of such fluid to the main body. The second on-off valve supplies a predetermined fluid to the first cylinder and controls the flow of the fluid therethrough to the first cylinder. The third on-off valve supplies a predetermined fluid to the second cylinder and controls the flow of the fluid therethrough to the second cylinder.

According to the invention, these first, second and third on-off valves are independently controlled to selectively determine the position of the piston in each cylinder, thereby opening and closing the valve body and adjusting the degree of opening thereof.

Preferably, the first and the second cylinder, respectively, include a stopper rod extending through the interior thereof, and the position of the piston in each cylinder is controlled by this stopper rod. Further, the stopper rods may have fixed at one end thereof a stopper. It is also preferred that the pistons includes a hollow body, in the interior of which the stopper is disposed. The displacement of the position of each piston is limited by the stopper rod which abuts against the walls of the piston. It is further preferred that one end of the stopper rod extending into the first cylinder has formed thereon a helical thread with whih a guide member disposed thereat engages so that the stopper rod can be screwed with respect to the guide member to change the position of the piston in the first cylinder. Further, the stopper extending into the second cylinder may have formed on one end thereof a second helical thread, and a second guide member engaging with the second helical thread may be disposed, the position of pistons being made variable by the rotation of the stopper rod with respect to the second guide member. It is also preferred that third guide member engaging with an exterior circumference of the second cylinder is provided, the displacement of the position of the second cylinder being effected through the third guide member. The main body may have formed therein a first and a second separate chamber partitioned by movement of the valve body. The first separate chamber may be formed in the direction of the movement of the valve body while the second separate chamber may be formed in the direction perpendicular to the direction of movement of the valve body.

The main body may be connected to a pressurizing cylinder of a molding machine through a flow circuit. The molding machine may be an injection molding machine or a die casting machine. The second separate chamber may be connected to a pressurizing cylinder of a molding machine through a hydraulic line.

The valve body may be closed by a introduction of a control fluid into the separate chamber in the main body. The control fluid may be introduced into the first separate chamber and the second cylinder situated to the side of the main body opposite to the first separate chamber, the valve body in the main body being set at a predetermined degree of opening by a position of the piston in the second cylinder. The control fluid may be introduced into the separate chamber in the first cylinder situated to the same side of the valve body as the first separate chamber without letting the control fluid act at the first separate chamber in the main body, the valve body being set at a predetermined degree of opening by a position of the piston in said first cylinder. The valve body may be set at a predetermined degree of opening by a position of the piston in the second cylinder without a control fluid being made to act at the second separate chamber in the main body and the second cylinder situated to the same side of the valve body as the second separate chamber.

BRIEF DESCRIPTION OF THE DRAWINGS

Further objects, characteristics and advantages of the present invention would become more apparent from the detailed description of the preferred embodiments taken in conjunction with the accompanying drawings, in which.

DETAILED DESCRIPTION OF THE PREFERRED EMBODIMENTS

Figure 1:
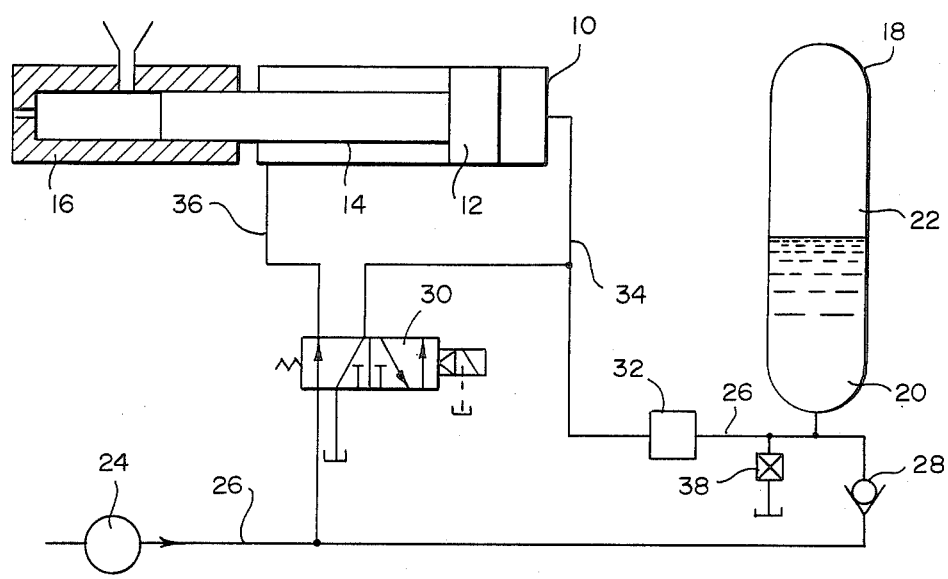
FIG. 1 is a diagrammatic view of a hydraulic circuit including a flow control valve according to the present invention.

Referring now to FIG. 1 of the drawings, the construction and the operation of a main hydraulic circuit for an injection cylinder of a die casting machine including a flow control valve according to the present invention is illustrated: The main hydraulic circuit comprises a cylinder 10 accommodating a piston 12 of which piston rod 14 serves as a piston in an injection cylinder 16 for injecting molten metal into a metallic mold (not shown). An accumulator 18 in the main circuit accommodates pressurized hydraulic oil 20 and pressurizing compressed gas 22. The hydraulic oil 20 is forced into the accumulator 18 by a pump 24 via a conduit 26 and a check valve 28 against pressure of the compressed gas 22. When a change-over valve 30 is operated toward the left, the hydraulic oil 20 in the accumulator 18 flows into the cylinder 10 via a flow control valve 32 which is described in detail hereinafter, and a conduit 34. Thus, the piston 12 in the cylinder 10 is pressed toward the left in FIG. 1, the flow of the hydraulic oil is assisted by pressure of the compressed gas 22 so that the piston 12 is moved at an extremely high speed to inject the molten metal in the injection cylinder 16 into the metallic mold. At the same time, the hydraulic oil in the cylinder 10 to the left of the piston 12 is returned to a reservoir via a conduit 36 and the change-over valve 30. Under this operation of the main hydraulic circuit, a stop valve 38 is held closed.

Referring now to FIGS. 2 through 6 of the drawings, a structure and operation of flow control valve 32 with its associated pilot cylinders according to the present invention is described.

In the figures, the main body 40 of the valve comprises a cylinder 42 and a valve body 44. The middle portion of the cylinder 42 which is about at the middle thereof is embossed and one of the corners thus formed serves as a valve seat 46. The valve body 44 is slidable along the axis X-Y. Accordingly, the forward end portion of the valve body 44 is seated at the valve seat 46. The valve body 44 seated at the valve seat 46 forms separate chambers B and C in the cylinder 42, and an inlet port 48, which is connected to the conduit 26, and an outlet port 50, which is connected to the conduit 34, are formed at the chambers B and C, respectively. Further, another separate chamber D is formed in the cylinder 42 by operation of the valve body 44 at the side opposite to the valve seat 46 and a control hydraulic pressure supply port 52 is formed thereat which communicates with a control hydraulic circuit 54 through an on-off valve 56. Thus, the main body 40 can be adjusted to regulate the rate of the hydraulic flow passing through the separate chambers B and C by sliding the valve body 44 along the axis X-Y and adjusting the distance thereof from the valve seat 46.

Pilot cylinders 58 and 60 are disposed coaxially with the main body 40 constructed as described above at both sides thereof. End portions of the valve rods 62 and 64 projecting from the axial center of the valve body 44 in the main body 40 extend through an end portion of the pilot cylinders 58 and 60 and reach the interior thereof, respectively. The pilot cylinders 58 and 60 include pistons 66 and 68 therein, respectively. Each piston 66 and 68 comprises a hollow body the end surface of which, opposing the valve rods 62 and 64 is closed. Openings 66a and 68a are provided in the end walls of the pistons 66 and 68, respectively. Stopper rods 70 and 72 extend therethrough, respectively, from the other ends of the pilot cylinders 58 and 60. Further, stoppers 74 and 76 are secured to the ends of the stopper rods 70 and 72 extending into the pistons 66 and 68.

A control hydraulic pressure supply port 78 is provided in the pilot cylinder 58 which can communicate with a separate chamber A partitioned by the piston 66. The control hydraulic circuit 54 communicate therewith through an on-off valve 80. The stopper rod 70 is provided with an adjustment screw 82 at one end thereof which engages with a guide 84 to extend therethrough so that the rod 70 is adjustable along the axis X-Y.

A separate chamber E partitioned by the piston 68 in the other pilot cylinder 60 is provided with a control hydraulic pressure supply port 86 to which the control hydraulic circuit 54 is connected through an on-off valve 88 to communicate therewith. The stopper rod 72 is provided with an adjustment screw 90 at one end thereof which engages with a guide 92 to extend therethrough so that the rod 72 is adjustable along the axis X-Y. Further, the pilot cylinder 60 is supported by a guide member 94 so that it is itself adjustable along the X-Y axis.

Operation of the hydraulic flow control valve constructed as above is described according to the variation of state with respect to the amount of flow through the main hydraulic circuit.

1. Stoppage State

Figure 2:
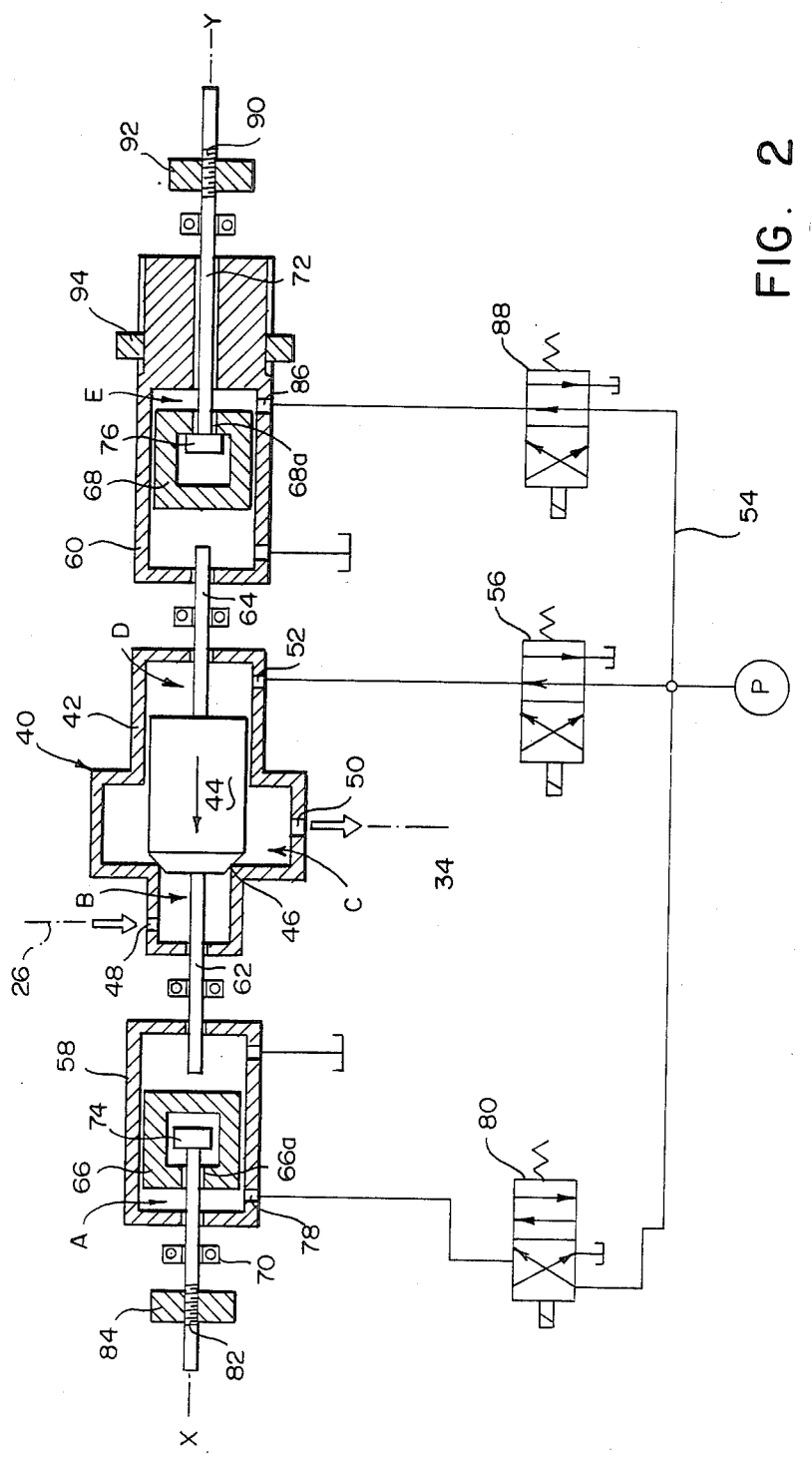
FIG. 2 is a schematic view of a flow control valve according to the present invention, showing the cross-sectional structure and the hydraulic circuit system thereof at its stoppage state.

FIG. 2 shows the case in which the flow control valve according to the present invention is set at the stoppage state, i.e., the degree of opening of the valve body 44 is set at zero (0). In this case, the conditions of hydraulic pressure in the chambers A, D, and E in the main body 40, in the pilot cylinders 58 and 60 are set as follows.

(1). Chamber A: Hydraulic pressure O (on-off valve 80 Off).

(2). Chamber D: Hydraulic pressure P (on-off valve 56 On).

(3) Chamber E: Hydraulic pressure P or O (on-off valve 88 On or Off).

Thus, the valve body 44 in the main body 40 is pressed in the direction of X by the hydraulic pressure acting at the chamber D, and is seated on the valve seat 46 so that the valve is set at the stoppage state as the flow passageway through the chambers B and C communicating with the main hydraulic circuit is closed.

2. First Speed State (Low Speed)

Figure 3:
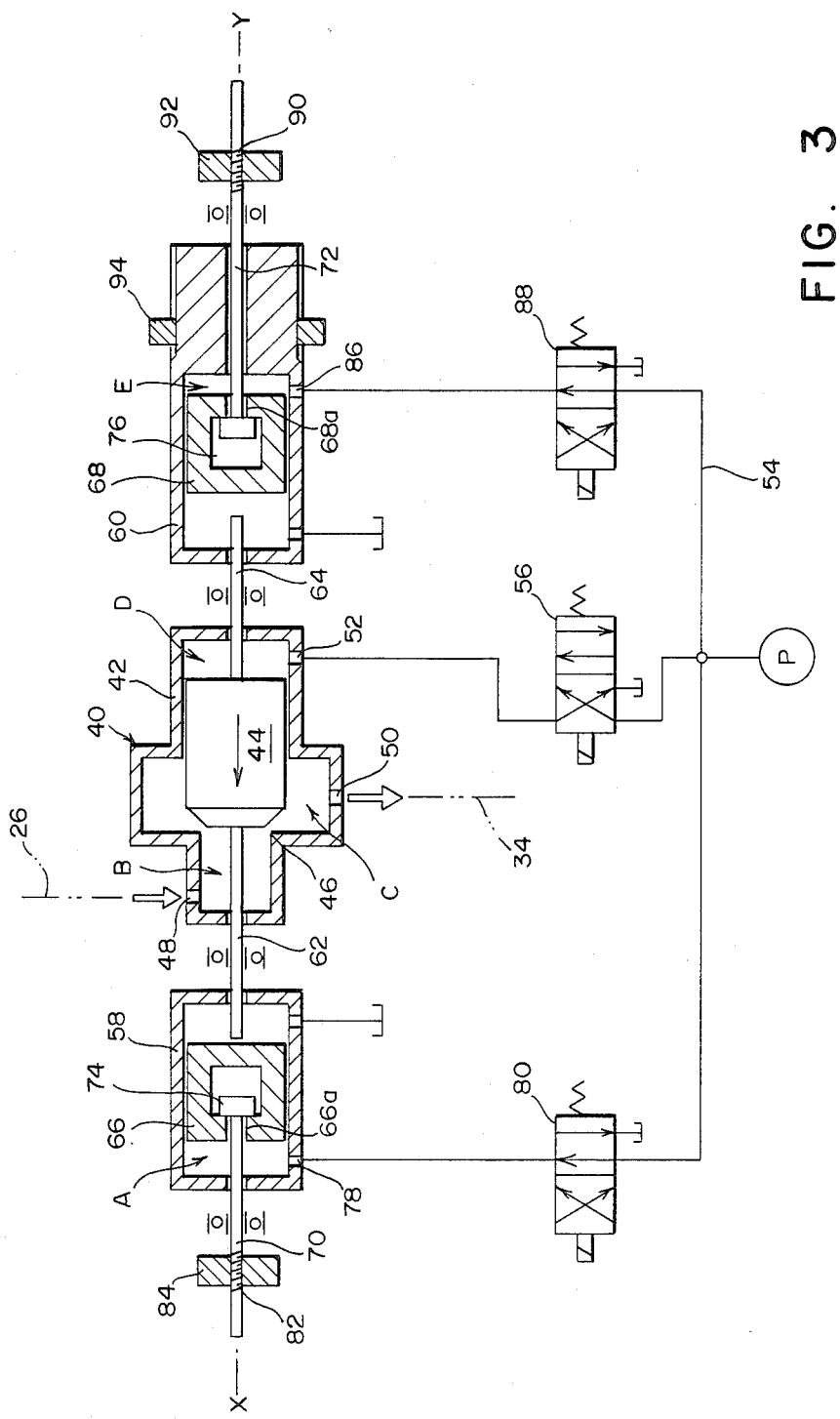
FIG. 3 is a view similar to FIG. 2, showing, however, the valve in its low speed state.

FIG. 3 shows the case in which the flow control valve according to the present invention is set at the first speed state, i.e., the degree of opening of the valve body 44 is set small. In this case, the conditions of hydraulic pressure in the chambers A, D, and E in the main body 40 and in the pilot cylinders 58 and 60 are set as follows.

(1). Chamber A: Hydraulic pressure P (on-off valve 80 On).

(2). Chamber D: Hydraulic pressure P (on off valve 56 off)

(3) Chamber E: Hydraulic pressure P or O (on off valve 88 off)

Thus, the piston 66 in the pilot cylinder 58 is pressed in the direction of Y to the position limited by the stopper 74 fixed to the end of the stopper rod 70 by the hydraulic pressure acting at the chamber A. At this moment, as one side of the piston 66 abuts against the end of the valve rod 62, the position of the valve rod 62 connected to the valve body 44 in the main body 40 is limited by the position of the piston 66. Further, as the valve body 44 is pressed in the direction of X by the hydraulic pressure acting at the chamber D, the valve body 44 becomes stable at the position at which the valve rod 62 is limited, and some clearance is formed between the valve body 44 and the valve seat 46. Thus, the interiors of the chambers B and C are put into the state in which a small amount of hydraulic oil can flow therethrough. By the way, the stopper rod 70 can be rotated with respect to the guide member 84 in this case so that it is adjusted in forward or backward position by action of the screw 82. As a result of this, the position of the piston 66 in the pilot cylinder 58 is changed so that the abutting position of one side of the piston 66 against the valve rod 62 is changed. Thus, the position of the valve body 44 in the main body 40 is changed and the degree of opening between the valve body 44 and the valve set 46 can be adjusted.

3. Second Speed State (Middle Speed State)

Figure 4:
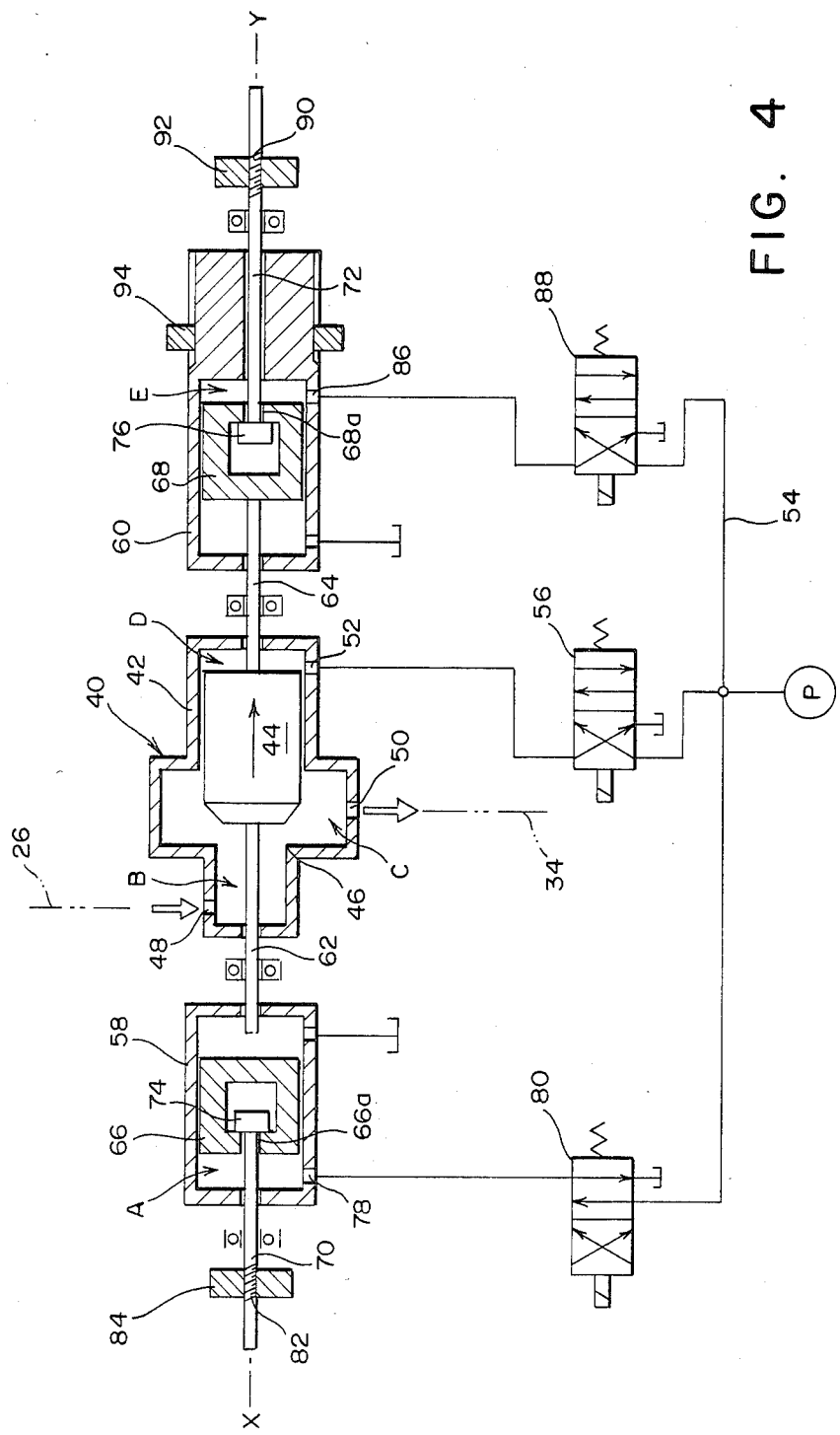
FIG. 4 is a view similar to FIGS. 2 and 3, showing, however, the valve in its middle speed state.

FIG. 4 shows the case in which the flow control valve according to the present invention is set at the second speed state, i.e., the degree of opening of the valve body 44 is set at the middle. In this case, the conditions of hydraulic pressure acting at the chambers A, D, and E in the main body 40 and in the pilot cylinders 58 and 60 are set as follows.

(1). Chamber A: Hydraulic pressure P or O (on-off valve 80 On or Off).

(2): Hydraulic pressure O (on-off valve 56 on)

(3). Chamber E: Hydraulic pressure P (on-off valve 88 off)

Thus, the piston 68 in the pilot cylinder 60 is pressed in the direction of X to the position limited by the stopper 76 by the hydraulic pressure acting at the chamber E. As one side of the piston 68 abuts against the end of the valve rod 64, the position of the valve rod 64 connected to the valve body 44 in the main body 40 is limited by the position of the piston 68. Further, as the valve body 44 is pressed in the direction of Y by the hydraulic pressure acting at the chambers B and C, the valve body 44 becomes stable at the position at which the valve rod 64 is limited, and middle degree of clearance is formed between the valve body 44 and the valve seat 46. Thus, the interiors of the chambers B and C are put in the state in which a middle amount of hydraulic oil can flow therethrough. As the stopper rod 72 can be rotated with respect to the guide member 92, it is adjusted in forward or backward position by the action of the screw 90. As the result of this, the position of the piston 68 in the pilot cylinder 60 is changed so that the abutting position of one side of the piston 68 against the valve rod 64 is changed. Accordingly, the position of the valve body 44 in the main body 40 is changed and the degree of opening between the valve body 44 and the valve seat 46 can be adjusted.

4. Third Speed State (High Speed State)

Figure 5:
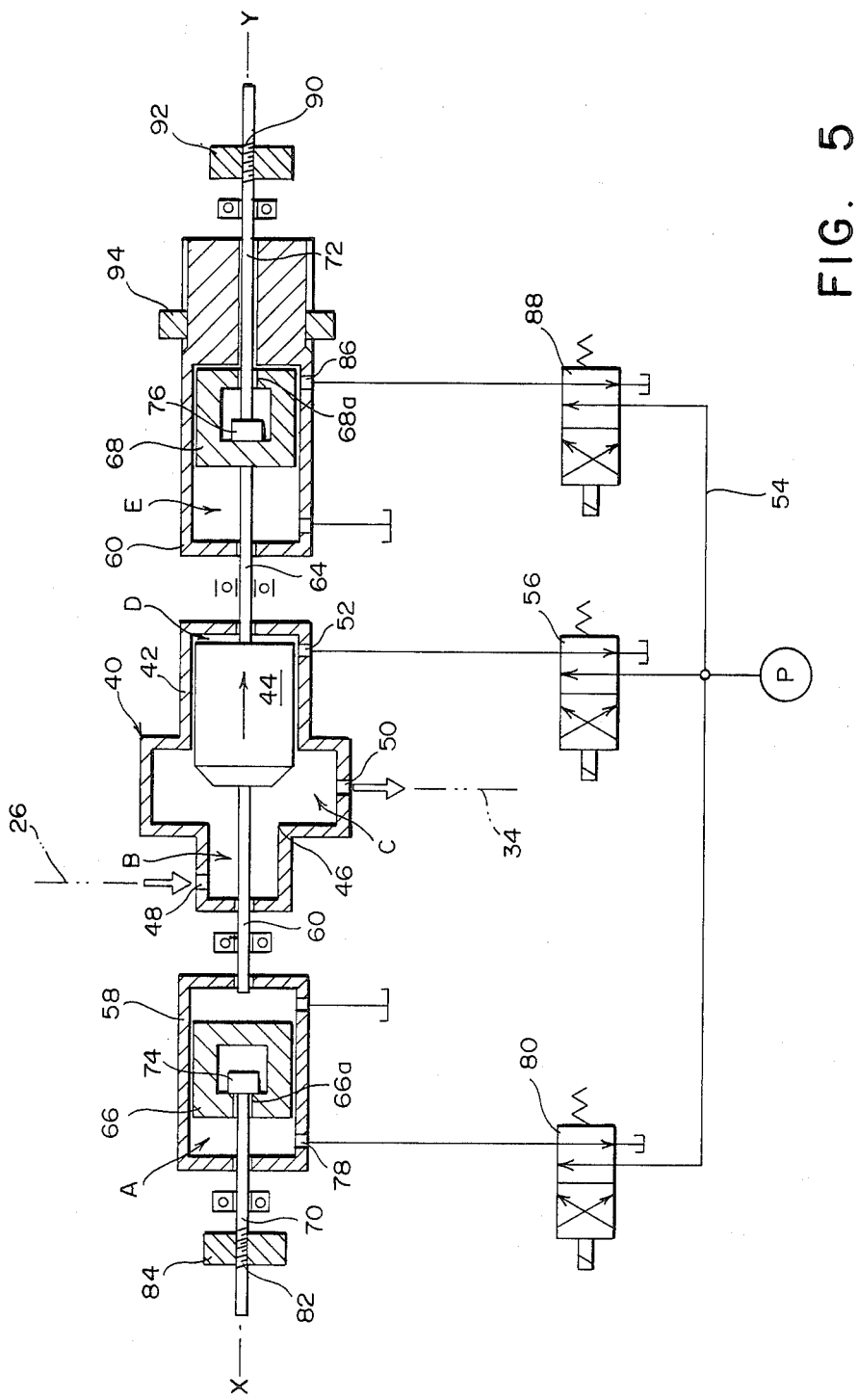
FIG. 5 is a view similar to FIGS. 2 through 4, showing, however, the valve in its high speed state.

FIG. 5 shows the case in which the flow control valve according to the present invention is set at the third speed state, i.e., the degree of opening of the valve body 44 is set great. In this case, the conditions of hydraulic pressure in the chambers A, D, and E in the main body 40 and in the pilot cylinders 58 and 60 are set as follows.

(1). Chamber A: Hydraulic pressure P or O (on-off valve 80 On or Off).

(2). Chamber D: Hydraulic pressure O (on-off valve 56 on)

(3). Chamber E: Hydraulic pressure O (on-off valve 88 on)

As the piston 68 in the pilot cylinder 60 is set free, the piston 68 moves to the position limited by the stopper 76 in the direction of the Y with respect to the valve rod 64 connected to the valve body 44 in the main body 40. Thus, as the valve body 44 in the main body 40 is pressed in the direction of Y by the hydraulic pressure acting at the chambers B and C, the valve body 44 becomes stable at the position at which the valve rod 64 is limited, and a great clearance is formed between the valve body 44 and the valve seat 46. Thus, the interiors of the chambers B and C communicating with the main hydraulic circuit is put in the condition in which a great amount of hydraulic oil can pass therethrough.

The position of the pilot cylinder 60 can be adjusted with respect to the guide member 94 so that the position of the piston 68 in the pilot cylinder 60 is changed and, as a result of this, the degree of opening between the valve body 44 and the valve seat 46 can be adjusted by changing the position of the valve body 44 in the main body 40.

As is apparent from the above-described embodiment, at least three on-off valves are disposed independently in the hydraulic flow control valve according to the present invention, and the amount of flow through the main hydraulic circuit can be changed at three stages by limiting the movement of the valve rods by the on-off operation of these valves. Further, the amount of flow at each level can be regulated by finely and independently adjusting the respective movement of the pistons in the pilot cylinders. Thus, the injection speed of the molten metal filled into the metallic mold in the die casting machine can be controlled effectively.

Furthermore, the on-off valves provided in the control hydraulic circuit controlling the main body and the pilot cylinders may be constructed as electromagnetic valves so that the operation timing can be electrically controlled by the sequence control process, which makes the valve applicable to a wide range of application areas as one of the automatic control device.

What is claimed is:

1. A flow control valve comprising:

a main body including a first side wall and a second side wall defining a first chamber with a first opening and a second chamber with a second opening defined therein, a valve seat portion provided between said first chamber and second chamber, said first and second openings being selectively in communication with each other to form a fluid passage;

valve means having a first side and a second side being provided within said main body in order to prevent said first chamber from communicating with said second chamber when said valve means is seated against said valve seat and to permit said first chamber to communicate with said second chamber when said valve means is spaced away from said valve seat;

a first valve rod having a first end and a second end, said first end of said first valve rod being fixed to said first side of said valve means and the second end of said first valve rod freely extending outside from said main body;

a second valve rod having a first end and a second end, said first end of said second valve rod being fixed to said second side of said valve means and the second end of said second valve rod freely extending outside from said main body;

a first cylinder provided adjacent to said first side wall of said main body and including a first hollow piston means engageable with said second end of said first valve rod for limiting the transferring of said valve means in said main body;

a second cylinder provided adjacent to said second side wall of said main body and including a second hollow piston means engageable with said second end of said second valve rod for limiting the transferring of said valve means in said main body;

a first stopper rod extending into the hollow portion of said first cylinder to limit the movement of said first piston means mounted within said first cylinder;

a second stopper rod extending into the hollow portion of said second cylinder to limit the movement of said second piston means mounted within said second cylinder;

a first on-off valve means operatively connected to said main body for selectively supplying fluid to said main body for imparting movement to said valve means toward said first cylinder;

a second on-off valve means operatively connected to said first cylinder for selectively supplying fluid to said first cylinder for imparting movement to said first piston means and for controlling the position of said first stopper rod; and a third on-off valve means operatively connected to said second cylinder for selectively supplying fluid to said second cylinder for imparting movement to said second piston means and for controlling the position of said second stopper rod, wherein said first chamber is formed in said main body in a direction of the movement of said valve means while said second chamber is formed in said main body in a direction perpendicular to the movement of said valve means and said first, second and third on-off valve means are selectively activated to limit transferring of said first and second valve rods to control fluid flow between said first and second openings in said main body by adjusting the spacing of the first side of said valve means relative to said valve seat, and said first hollow piston means is floatably provided in said first cylinder while said second hollow piston means is floatably provided in said second cylinder.

2. A flow control valve according to claim 1, wherein said first stopper rod extending into the first cylinder includes at one end thereof a helical thread with which a guide member is engaged, a limiting position of said first piston means in said first cylinder is made variable by a rotation of said first stopper rod in said first cylinder with respect to said guide member.

3. A flow control valve according to claim 1, wherein said second stopper rod extending into said second cylinder includes at one end thereof a second helical thread with which a second guide member is engaged, a limiting position of the second piston means is made variable by a rotation of said stopper rod means in said second cylinder with respect to said second guide member.

* * * * *